United States Patent
Choi et al.

(10) Patent No.: US 9,445,463 B2
(45) Date of Patent: Sep. 13, 2016

(54) LED LIGHTING DEVICE USING BALLAST FOR FLUORESCENT LAMP

(71) Applicant: HiDeep Inc., Seongnam-si, Gyeonggi-do (KR)

(72) Inventors: Jaeyoung Choi, Daegu (KR); Hee Seok Han, Gyeonggi-do (KR)

(73) Assignee: HiDeep Inc., Gyeonggi-do (KR)

( * ) Notice: Subject to any disclaimer, the term of this patent is extended or adjusted under 35 U.S.C. 154(b) by 318 days.

(21) Appl. No.: 13/865,776

(22) Filed: Apr. 18, 2013

(65) Prior Publication Data

US 2013/0278161 A1    Oct. 24, 2013

(30) Foreign Application Priority Data

Apr. 20, 2012   (KR) .................. 10-2012-0041406

(51) Int. Cl.
H05B 33/08   (2006.01)

(52) U.S. Cl.
CPC ...... H05B 33/0815 (2013.01); H05B 33/0809 (2013.01); *Y02B 20/386* (2013.01)

(58) Field of Classification Search
CPC .......... H05B 33/0803; H05B 33/0815; Y02B 20/386
See application file for complete search history.

(56) References Cited

U.S. PATENT DOCUMENTS

| | | | |
|---|---|---|---|
| 8,076,920 B1 * | 12/2011 | Melanson ................. | 323/299 |
| 8,905,579 B2 * | 12/2014 | Dobbins et al. ......... | 362/249.02 |
| 2008/0094837 A1 * | 4/2008 | Dobbins et al. .......... | 362/249 |
| 2010/0033095 A1 * | 2/2010 | Sadwick ................... | 315/51 |
| 2010/0102729 A1 * | 4/2010 | Katzir et al. ............. | 315/113 |
| 2011/0043127 A1 | 2/2011 | Yamasaki | |
| 2013/0221867 A1 * | 8/2013 | Deppe et al. ............. | 315/224 |
| 2013/0320869 A1 * | 12/2013 | Jans et al. ................ | 315/186 |

FOREIGN PATENT DOCUMENTS

| | | | | |
|---|---|---|---|---|
| CN | 202261914 U | * | 5/2012 | ............ H05B 37/02 |
| JP | 05-193452 | | 8/1993 | |
| JP | 2011-044316 A | | 3/2011 | |
| KR | 10-0884279 B1 | | 2/2009 | |
| KR | 10-0937206 B1 | | 1/2010 | |
| KR | 10-0974703 | | 8/2010 | |
| KR | 10-1002600 B1 | | 12/2010 | |
| KR | 10-2011-0040262 | | 4/2011 | |
| KR | 10-2011-0084625 A | | 7/2011 | |

OTHER PUBLICATIONS

Machine translation of CN202261914U.*
Korean Office Action; KR Appln. No. 10-2012-0041406; Jun. 24, 2013; 5 pages.
European Office Action; EP Appln. No. 13164441.1; Oct. 1, 2013; 7 pages.

(Continued)

*Primary Examiner* — Douglas W Owens
*Assistant Examiner* — Pedro C Fernandez
(74) *Attorney, Agent, or Firm* — Foley & Lardner LLP

(57) ABSTRACT

Disclosed is an LED lighting device using a ballast for a fluorescent lamp, the LED lighting device including: an LED part which includes at least one LED device; a rectifier which rectifies a power signal outputted from the ballast for a fluorescent lamp; and a controller which receives an output signal of the rectifier and controls power transmitted from the ballast to the LED part.

11 Claims, 8 Drawing Sheets

(56) References Cited

OTHER PUBLICATIONS

Japanese Office Action; JP Appln. No. 2013-082629; Mar. 4, 2014; 2 pages.

Notice of Allowance issued in KR No. 10-2012-0069929; issued Jan. 28, 2014; 5 pages.

Office Action issued in KR No. 10-2012-0069929; dated Jul. 23, 2013; 4 pages.

* cited by examiner

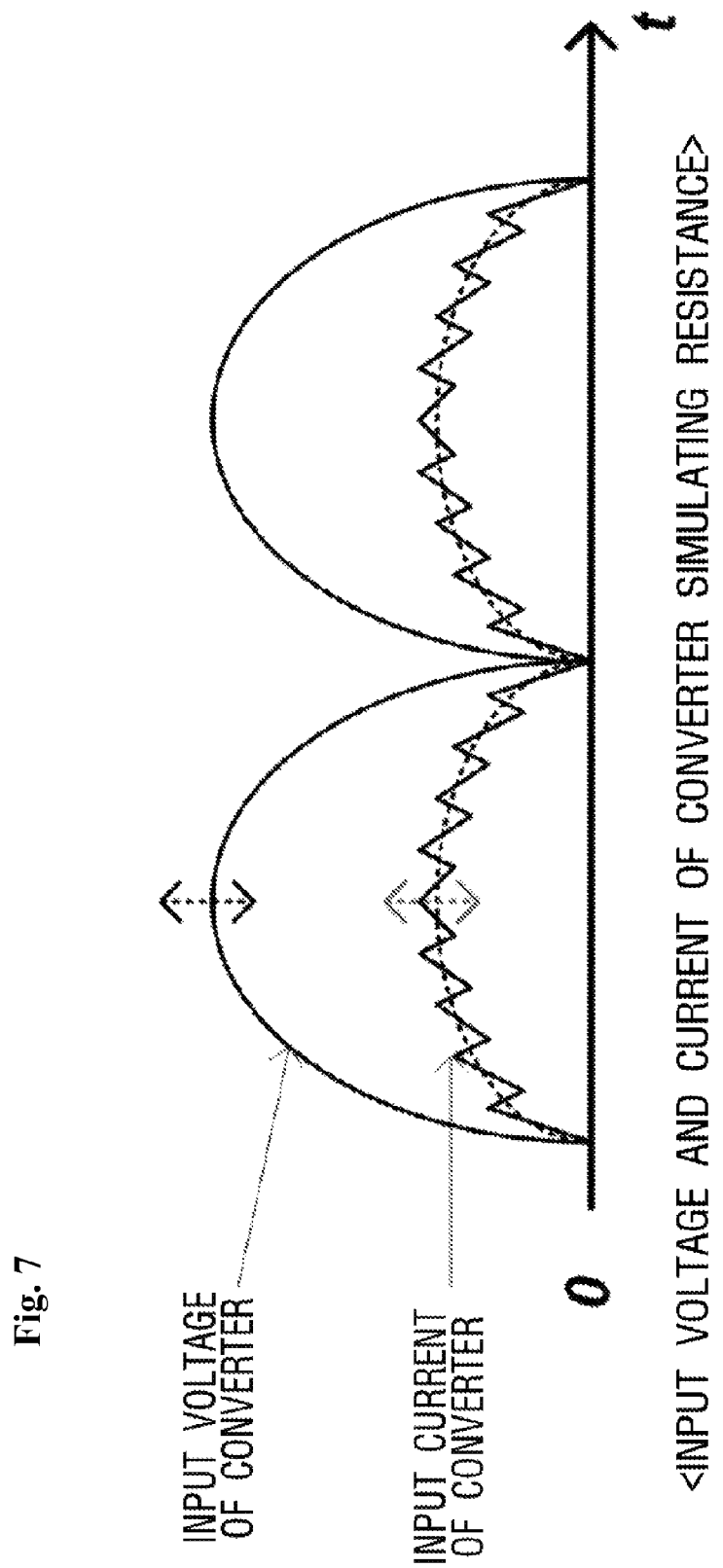

LED LIGHTING DEVICE USING BALLAST FOR FLUORESCENT LAMP

BACKGROUND

1. Field

The present invention relates to an LED lighting device using a ballast for a fluorescent lamp.

2. Description of Related Art

Recently, a light emitting diode (LED) is increasingly used as a new lighting device in lieu of a filament bulb, a fluorescent lamp and the like and becomes popular. The LED can be driven by a low voltage and has a longer lifespan, lower power consumption, a more rapid response speed and stronger crashworthiness than those of other lighting devices. The LED can be also smaller and lighter. However, since the LED is operated by a very low direct current power and is lighted in a different manner from that of the fluorescent lamp, an ordinary LED lamp cannot be used as it is in a fluorescent lighting system. Basically, a ballast for the fluorescent lamp converts a commercial alternating current power of 60 Hz into a radio frequency of several tens of KHz, and then provides to the lamp. Therefore, not only all the existing fluorescent lighting devices but also the ballast for the fluorescent lamp must be removed in order to use the LED lighting device. If an LED driving circuit is directly connected to a connection terminal of a conventional ballast for the fluorescent lamp without removing the ballast, etc., the LED driving circuit cannot process correctly the high frequency signal or voltage of the ballast, etc., so that the LED lamp is not operated or is destroyed, and the like.

Accordingly, an LED lighting device is recently being developed, which can be directly connected to the ballast for the fluorescent lamp without removing the ballast for the fluorescent lamp.

SUMMARY

One embodiment is an LED lighting device using a ballast for a fluorescent lamp. The LED lighting device includes: an LED part which includes at least one LED device; a rectifier which rectifies a power signal outputted from the ballast for a fluorescent lamp; and a controller which receives an output signal of the rectifier and controls power transmitted from the ballast to the LED part.

The controller may include: a switch which electrically connects or disconnects the transmission of a portion of an inputted ballast output power from the rectifier to the LED part; and a switch controller which controls on/off operation of the switch.

The switch controller may control on/off of operation of the switch by using at least one of an output voltage of the rectifier, an output current of the rectifier and current flowing the LED part.

The controller further may include a diode or a second switch which prevents current from backflowing from the LED part.

The controller may include: a switching converter which simulates an output voltage of the rectifier and generates a converter input current inputted to the controller; and a switch controller which controls on/off of a switch included in the switching converter.

The switching converter may be comprised of a boost converter, a SEPIC converter or a Cuk converter.

The switch controller may control on/off of operation of the switch by using at least one of the output voltage of the rectifier, an output current of the rectifier and current flowing the LED part.

The LED lighting device may further include a filter which smoothes an output signal from the controller and transmits to the LED part.

BRIEF DESCRIPTION OF THE DRAWINGS

FIG. 4 is a view showing a waveform of a specific signal of the LED lighting device using the ballast for a fluorescent lamp shown in FIG. 3a;

FIG. 7 is a view showing waveforms of a voltage and a current inputted to a boost converter of the LED lighting device which is shown in FIG. 6 and uses the ballast for a fluorescent lamp.

DETAILED DESCRIPTION

Figure 1:
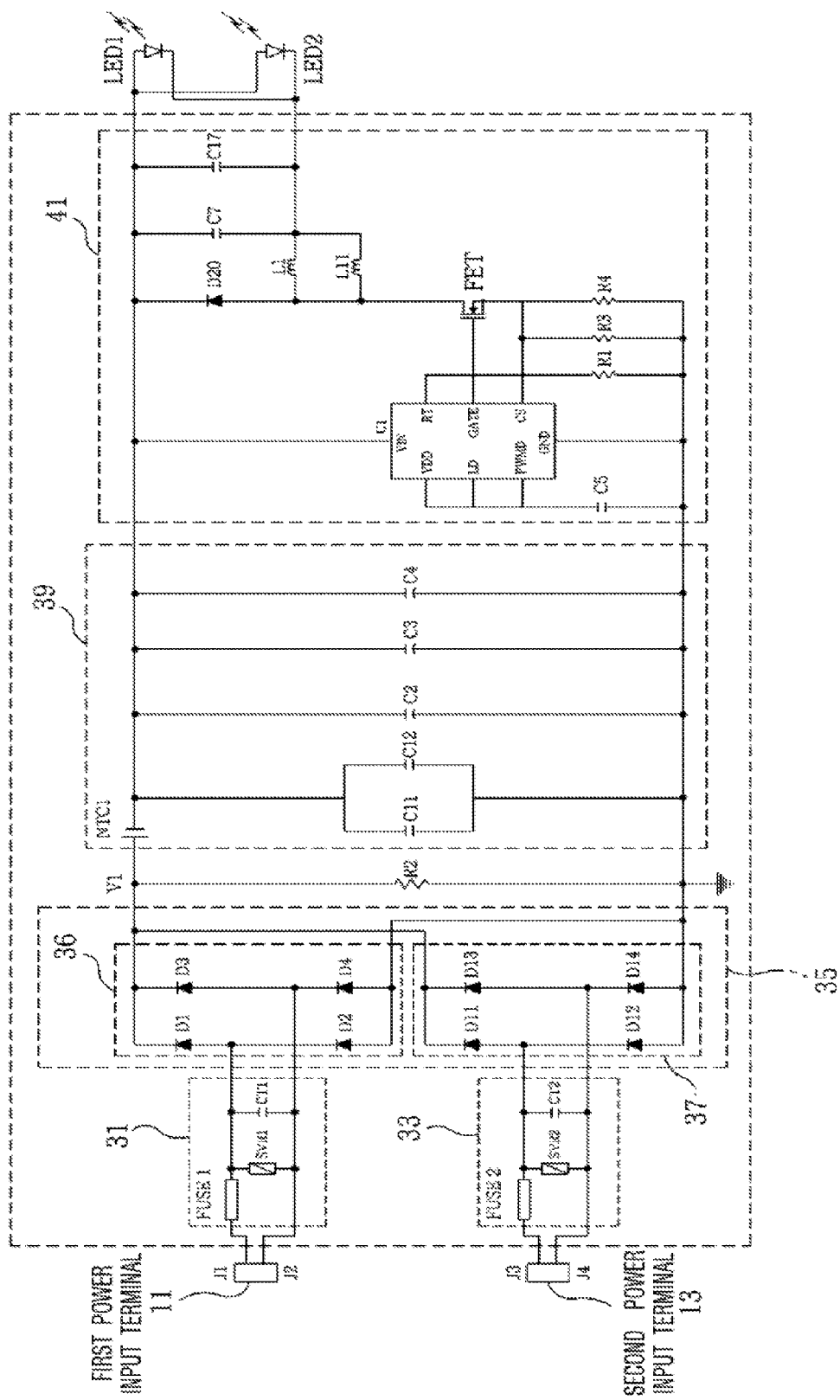
FIG. 1 is a circuit diagram of a general LED lighting device using a ballast for a fluorescent lamp.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

[Exemplary Embodiment of the Present Invention]

Prior to the description of an LED lighting device using a ballast for a fluorescent lamp in accordance with an embodiment of the present invention, a principle of a conventional LED lighting device using a ballast for a fluorescent lamp will be briefly described.

FIG. 1 shows a conventional LED lighting device using a ballast for a fluorescent lamp.

Referring to FIG. 1, in the conventional LED lighting device, power sources 31 and 33 receive alternating current power through power input terminals 11 and 13. A rectifier 35 receives and full-wave rectifies the electric power from the power sources 31 and 33 and then transmits to a filter 39. The filter 39 smoothes the full-wave rectified voltage from the rectifier 35 into a direct current voltage and then transmits to a driving part 41. The driving part 41 includes a buck-boost converter and controls the voltage and current supplied to the LED to be constant by using the direct current voltage outputted from the filter 39.

However, the conventional LED lighting device shown in FIG. 1 has a structure for controlling only the power transmitted to the LED without considering the output of the ballast. When the output power of the ballast is larger than a power required by the LED, energy is accumulated in a capacitor of the filter 39 and the voltage continuously rises. With the continuous increase of the voltage applied to the capacitor, passive devices or chips of the LED lighting device are damaged. That is, the lifespan of the LED lighting device is shortened. Besides, the LED lighting device is not compatible with various ballasts having different standards and has stability vulnerable to the power change.

An LED lighting device to be described below which uses a ballast for a fluorescent lamp in accordance with an embodiment of the present invention is able to overcome the problems of the conventional LED lighting device.

Hereafter, the LED lighting device which uses a ballast for a fluorescent lamp in accordance with a first embodiment of the present invention will be described.

First Embodiment

Figure 2:
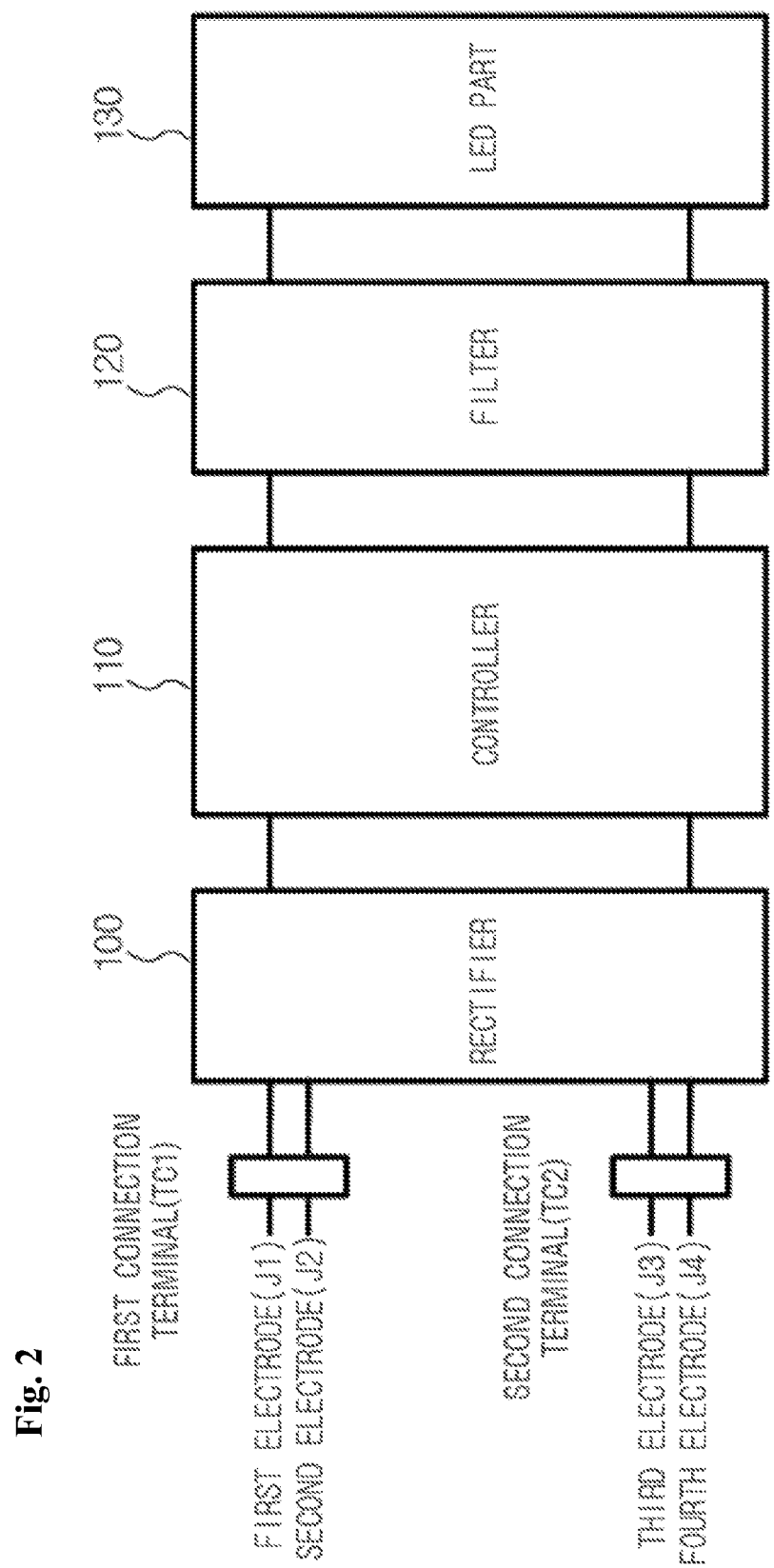
FIG. 2 is a block diagram of an LED lighting device using the ballast for a fluorescent lamp in accordance with an embodiment of the present invention.

FIG. 2 is a block diagram of an LED lighting device using the ballast for a fluorescent lamp in accordance with a first embodiment of the present invention.

Referring to FIG. 2, the LED lighting device using the ballast for a fluorescent lamp in accordance with the embodiment of the present invention includes a rectifier 100 which rectifies a power signal outputted from the ballast for a fluorescent lamp, a controller 110 which receives the output signal from the rectifier 100 and outputs a rated voltage signal and a rated current signal for a LED part 130 to be described later, and the LED part 130 which includes at least one LED device.

Also, the LED lighting device using the ballast for a fluorescent lamp in accordance with the embodiment of the present may further include a filter 120 which smoothes the output signal from the controller 110 and transmits to the LED part 130.

Figure 3A:
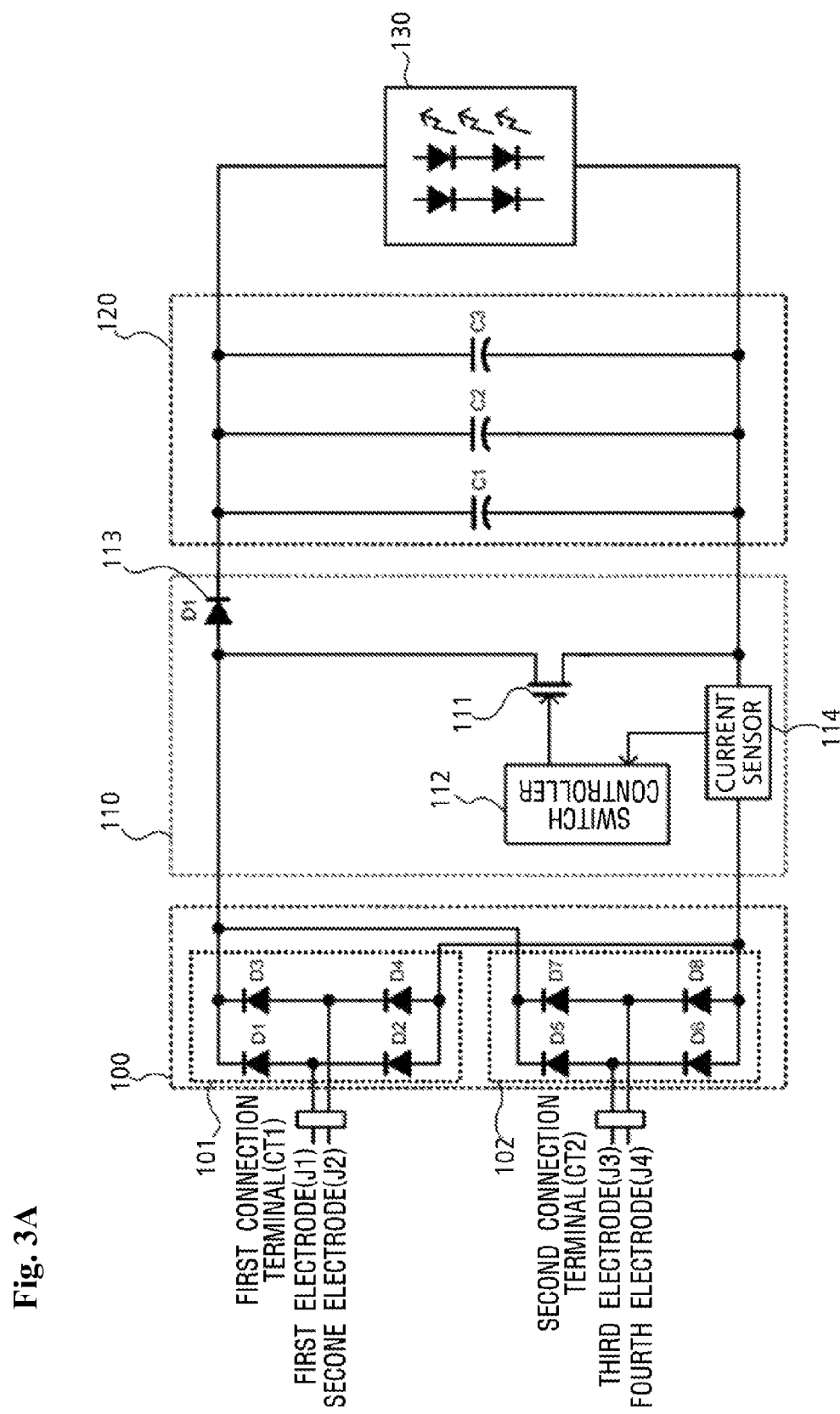
FIGS. 3a and 3b are circuit diagrams of the LED lighting device using the ballast for a fluorescent lamp in accordance with the embodiment of the present invention.
Figure 3B:
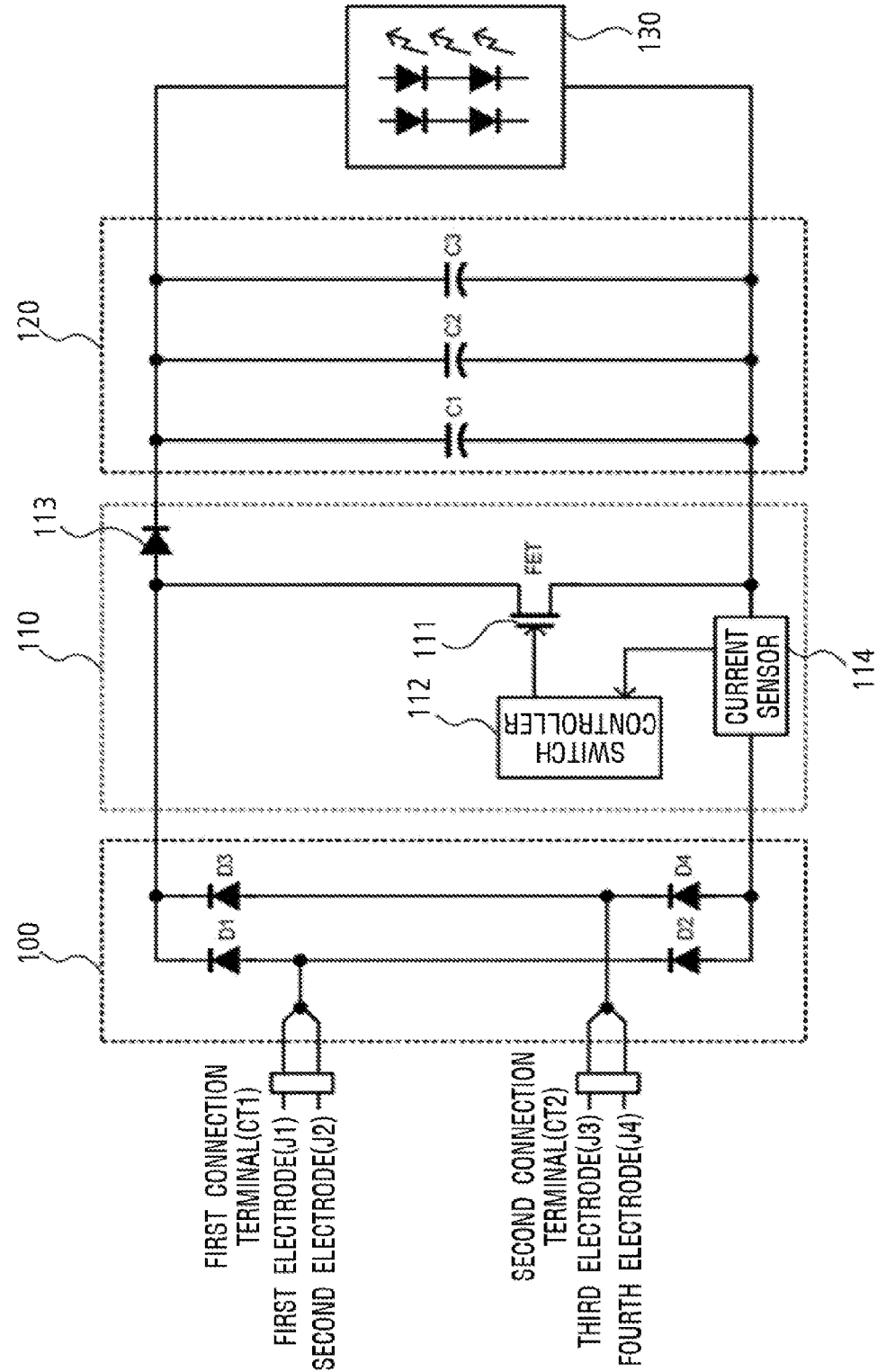

FIGS. 3a and 3b are circuit diagrams of the LED lighting device ng the ballast for a fluorescent lamp in accordance with the first embodiment of the present invention.

As shown in FIG. 3a, the rectifier 100 rectifies the power voltage outputted from the ballast for a fluorescent lamp. The rectifier 100 may include a first rectifier 101 and a second rectifier 102. The first rectifier 101 or the second rectifier 102 may be implemented by a common diode or an application device of the diode (e.g., a bridge rectifier circuit, etc.). Here, any device capable of rectifying alternating current power can be included in the rectifier 100 of the present invention.

The rectifier 100 may include a first electrode J1, a second electrode J2, a third electrode J3 and a fourth electrode J4. The rectifier 100 full-wave rectifies the alternating current power inputted through any two out of the first to the fourth electrodes J1 to J4 and then transmits to the controller 110 to be described later. Bridge diodes D1 to D4 of the first rectifier 101 and bridge diodes D5 to D8 of the second rectifier 102 should have a combination of the same type (a connection direction of the diode, and the like) respectively with respect to a first connection terminal CT1 and a second connection terminal CT2, both of which receive electric power from the ballast for a fluorescent lamp. This is because when the diodes don't have a combination of the same type, the first connection terminal CT1 and the second connection terminal CT2 are directly connected to each other through the first and the second rectifiers 101 and 102.

As shown in FIG. 3a, when alternating current power is inputted through the first electrode J1 and the second electrode J2 or through the third electrode J3 and the fourth electrode J4, the first rectifier 101 or the second rectifier 102 outputs a full-wave rectified voltage to the controller 110. In the combinations of the bridge diodes D1 to D4 and D5 to D8, it is desirable to use a high-frequency diode for processing the alternating current power of a frequency, which is several hundred times as much as a commercial electric power outputted from the ballast for a fluorescent lamp.

Meanwhile, as shown in FIG. 3b, the rectifier 100 may be implemented by one rectifier circuit rectifying alternating current power inputted through the first to the fourth electrodes J1 to J4. A conventional lighting device using a ballast for a fluorescent lamp receives alternating current power through the first to the fourth electrodes J1 to J4 from the ballast. Also, the conventional lighting devices have mutually different configurations for receiving the alternating current power through the first to the fourth electrodes J1 to J4. Contrary to this, an LED lamp consumes less power than the fluorescent lamp, so that the LED lamp can be lighted by the power input from the two electrodes. The rectifier 100 of the LED lighting device which uses the ballast for a fluorescent lamp in accordance with the embodiment of the present invention is able to rectify the electric power received through the at least two out of the first to the fourth electrodes J1 to J4 and transmit to the controller 110. Therefore, the LED lighting device is compatible with various ballasts for a fluorescent lamp, which use the combinations of the first to the fourth electrodes J1 to J4.

As shown in FIG. 3a, the controller 110 receives the rectified signal outputted from the rectifier 100 and controls the electric power transmitted from the ballast to the LED part. That is, the controller 110 uses the ballast output and thus outputs a rated voltage signal and a rated current signal for the LED part 130. The controller 110 includes a first terminal N1 and a second terminal N2 and transmits/receives a power signal to/from the rectifier 100 through the first terminal N1 and the second terminal N2. The controller 110 may include a switch 111 and a switch controller 112. The switch 111 electrically connects or disconnects the transmission of a portion of the inputted ballast output power from the rectifier 100 to the filter 120 or the LED part 130. The switch controller 112 controls on/off operation of the switch 111. The controller 110 may further include a diode 113 which prevents the current from backflowing from the filter 120 or the LED part 130. While FIG. 3a shows that the diode 113 is employed to prevent the backflow of the current, there is no limit to this. For example, for the purpose of preventing the backflow of the current, the controller 110 may use a switch which maintains an on-state when the power is connected and which maintains an off-state when the power is disconnected. The switch 111 may be implemented by a transistor and may be implemented by an MOS transistor in order to obtain a rapid response speed. The switch controller 112 transmits a control signal to a gate terminal of the switch 111 implemented by the MOS transistor and then is able to on/off control the connection of a drain terminal and a source terminal of the switch 111.

Referring to FIG. 3a, the switch 111 is located between the first terminal N1 and the second terminal N2. Specifically, the drain terminal and the source terminal of the switch 111 are connected to the first terminal N1 and the second terminal N2 of the controller 110 respectively. It can be considered that the drain terminal and the source terminal may swap their positions. That is, when the switch 111 becomes an on-state, the rectified voltage inputted to the first terminal N1 flows back to the rectifier 100 through the second terminal N2 without being transmitted to the filter 120 or the LED part 130.

The switch controller 112 controls on/off operation of the switch 111. The switch controller 112 is able to control a time during which the switch 111 maintains the on/off states. For instance, the switch controller 112 is able to control luminous intensity of the LED part 130 by switching on/off the switch 111 during a predetermined time. Also, the switch controller 112 senses a magnitude of output current of the rectifier 100 or a magnitude of current flowing through the LED part 130, thereby controlling the on/off operation of the switch 111 in such a manner that the magnitude of the current flowing through the LED part 130 is constant. For example, as shown in FIG. 3a, the controller 111 may further include a separate current sensor 114 which senses the magnitude of the current flowing through the LED part 130 and then transmits to the switch controller 112.

The filter 120 includes a capacitor and smoothes the voltage and current controlled by the controller 110, and then supplies to the LED part 130. The filter 120 may include at least one capacitor. While FIG. 3a shows that one or more capacitors C1 to C3 are connected in parallel to each other, there is no limit to this. It is recommended that the filter 120 is designed in such a manner as to have a time constant sufficient to smooth radio frequency alternating current power supplied by the controller 110, and thus does not affect the LED part 130.

The LED part 30 includes LED devices emitting light by using voltage and current supplied from the filter 120. The LED devices included in the LED part 130 are lighted by being in parallel or in series connected to each other.

Figure 4:
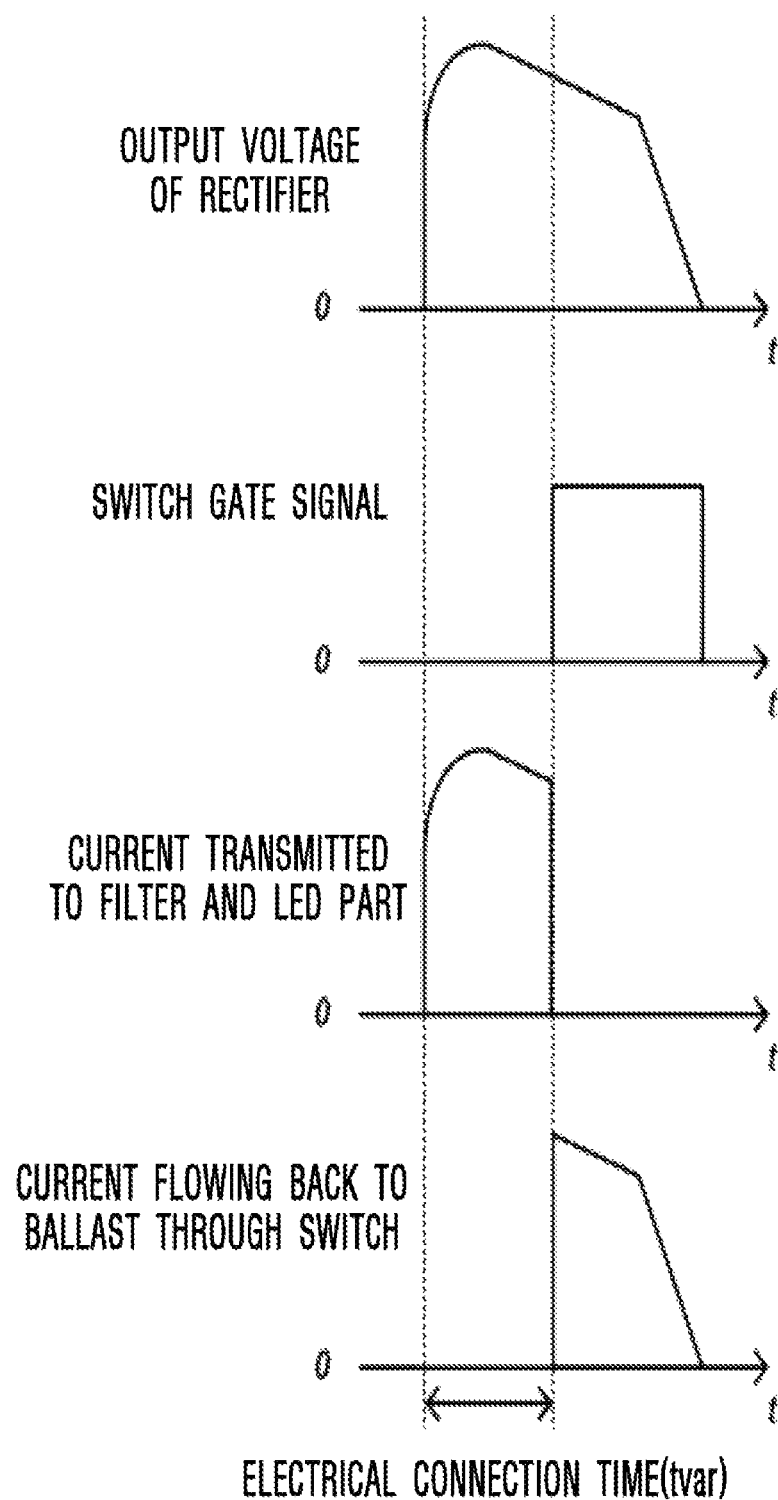

FIG. 4 is a view showing a waveform of a specific signal of the controller of the LED lighting device using the ballast for a fluorescent lamp in accordance with the first embodiment.

Referring to FIGS. 3a and 4, an output current signal of the rectifier corresponds to a pulsating current signal obtained by rectifying alternating current power. As shown in FIG. 4, the output current signal of the rectifier may be varied according to the ballast. Output current of the ballast is a signal having a frequency of several tens of KHz. The controller 110 transmits the current signal received from the ballast to the filter 120 and the LED part 130 during an electrical connection time (tvar), and disconnects the transmission of the power transmitted from the ballast to the filter 120 and the LED part 130 for the rest of the time. Specifically, the switch controller 112 transmits a signal causing the switch 111 to maintain the off-state during the electrical connection time (tvar). Therefore, the current signal transmitted from the ballast during the electrical connection time (tvar) is transmitted to the filter 120 and the LED part 130 through the first node N1. Meanwhile, when the switch controller 112 transmits a gate signal which turns on the switch 111, the switch 111 becomes an on-state, and then the first terminal N1 and the second terminal N2 are connected to each other, so that the current transmitted from the rectifier flows back to the rectifier 100 or the ballast. Accordingly, the amount of the current transmitted to the filter 120 and the LED part 130 can be adjusted by adjusting the electrical connection time (tvar). As a result, it is possible to control the power transmitted to the LED part 130 through the adjustment of the electrical connection time (tvar).

Hereafter, the following table 1 shows a power consumption test result of the LED lighting device using the ballast for a fluorescent lamp in accordance with the first embodiment of the present invention.

TABLE 1

| Electrical connection time tvar (μs) | LED power consumption P_LED (W) | Ballast input power P_in (W) |
| --- | --- | --- |
| No switching | 25.6 | 26.4 |
| 7.5 | 24.4 | 25.9 |
| 7 | 22.8 | 24.9 |
| 6.5 | 21.3 | 23.2 |
| 6.2 | 19.8 | 21.9 |
| 5.5 | 15.0 | 17.2 |

Referring to FIG. 3a and Table 1, when the switch 111 of the controller 110 is in an off-state all the time without switching, an input power (P_in) transmitted from the ballast is 26.4 W and an LED power (P_LED) consumed by the LED part 130 is 25.6 W. Contrary to this, when the switch 111 switches such that the rectified ballast output current of several tens of KHz is electrically connected for 6.2 microsecond (μs) per one cycle, the input power (P_in) transmitted from the ballast is 21.9 W and the LED power (P_LED) consumed by the LED part 130 is 19.8 W. In other words, it can be found that the ballast input power (P_in) and the LED power consumption (P_LED) are decreased with the decrease of the electrical connection time (tvar). This is because the controller 110 of the LED lighting device using the ballast for a fluorescent lamp in accordance with the embodiment of the present invention controls the magnitude of the power inputted from the ballast and transmits to the LED part 130.

Accordingly, regarding the input power (P_in) transmitted from the ballast and the LED power consumption (P_LED), there is an effect that the power consumed by the LED part 130 is controlled by the power transmission control of the controller 110. The adjustment of the electrical connection time (tvar) makes it possible to control the LED power consumption to have a desired value in a wide range. Also, as shown in Table 1, as the electric connection time (tvar) is decreased, the power which is not consumed by the LED part 130 flows back again to the rectifier 100 or the ballast. Therefore, the ballast receives a commercial alternating current power of 60 Hz and consumes less power, so that an energy efficiency becomes higher.

TABLE 2

| | Resonance circuit | | | | 20 W control | |
| --- | --- | --- | --- | --- | --- | --- |
| | device value of ballast | | | No switching LED power | Electrical connection | LED power consumption |
| Ballast | Ls (mH) | Cs (nF) | Cp (nF) | consumption (P_LED) (W) | time tvar (μs) | (P_LED) (W) |
| A | 1.8 | 11.2 | 4.7 | 25.6 | 6.2 | 19.8 |
| B | 2.3 | 16.4 | 5.6 | 27.6 | 6.8 | 19.7 |

Table 2 shows power consumption of the LED lighting device using the ballast for a fluorescent lamp in accordance with the embodiment of the present invention with respect to any ballasts A and B for a fluorescent lamp.

Ls, Cs and Cp are devices configuring a resonance circuit in a ballast circuit and are not shown in the embodiment of the present invention.

Referring to FIG. 2 and Table 2, when the controller 110 does not perform a switching control, the power consumptions of the LED lighting devices using the ballasts A and B are 25.6 W and 27.6 W respectively. That is, the amount of the power consumed by the LED part varies according to the ballast. However, the controller 110 according to the embodiment of the present invention controls the electrical connection time (tvar) of the switch 111, so that the LED power consumption can be controlled constant. As shown in Table 2, it can be understood that regarding the ballast A, when the electrical connection time (tvar) of the switch 111 is set to be 6.2, the LED power consumption is 19.8 W, and regarding the ballast B, when the electrical connection time (tvar) of the switch 11 is set to be 6.8, the LED power consumption is 19.7 W.

That is to say, with regard to various ballasts having different device values respectively, the electrical connection time (tvar) of the switch 111 of the controller 110 is adjusted, so that a magnitude of the power consumed by the LED part 130 can be controlled to be constant. By doing this, rated voltage and current required by the LED part 130 can be supplied. Accordingly, since regardless of device characteristics of the ballast, the constant power can be supplied to the LED part 130 by on/off controlling the switch 111, the LED lighting device is compatible with various ballasts. Also, since the power required by the LED part 130 is supplied, it is possible to fundamentally remove problems that energy is accumulated in the filter 120 or LED brightness is not controllable, etc., due to the inappropriateness between the output power of the ballast and the power consumed by the LED lighting device, thereby preventing chips or passive devices, for example the filter 120 from being damaged.

Next, a second embodiment of the present invention will be described.

Second Embodiment

Figure 5:
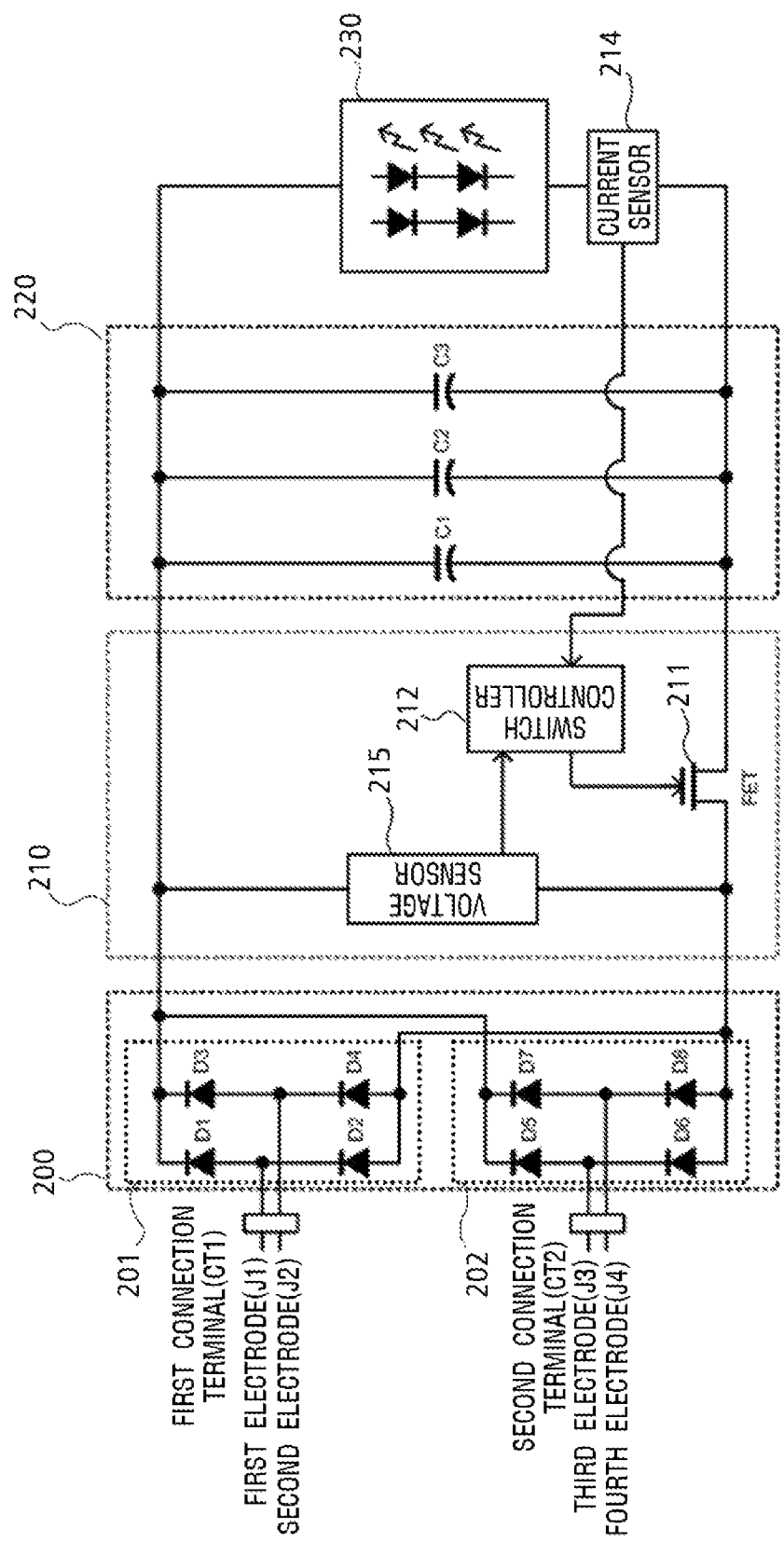
FIG. 5 is a circuit diagram of an LED lighting device using the ballast for a fluorescent lamp in accordance with another embodiment of the present invention.

FIG. 5 is a circuit diagram of an LED lighting device using the ballast for a fluorescent lamp in accordance with a second embodiment of the present invention.

Referring to FIG. 5, the LED lighting device using the ballast for a fluorescent lamp in accordance with the second embodiment includes a rectifier 200, a controller 210 and an LED part 230. As with the first embodiment, the LED lighting device may further include a filter 220 between the controller 210 and the LED part 230.

Since the rectifier 200 and the filter 220 of the LED lighting device which is shown in FIG. 5 and uses the ballast for a fluorescent lamp are the same as those of the first embodiment, a detailed description thereof will be omitted.

As shown in FIG. 5, the controller 210 according to the second embodiment may include a switch 211 and a switch controller 212. The switch 211 connects or disconnects current flow between the rectifier 200 and the filter 220 or between the rectifier 200 and the LED part 230. The switch controller 212 controls on/off of operation of the switch 211. The controller 210 may further include a voltage sensor 215 which senses a voltage transmitted from the rectifier 200 to the controller 210 and transmits to the switch controller 212. The voltage sensor 215 senses a magnitude of a ballast output voltage (Vballast) rectified by the rectifier 200 and then transmits to the switch controller 212. The switch controller 212 controls the power transmitted to the LED part 230 by on/off controlling the switch 211 in accordance with a magnitude of a voltage transmitted to the controller 210. Meanwhile, as shown in FIG. 5, the LED part 230 may include a current sensor 214 which senses a magnitude of a current flowing through the LED part 230 and then transmits to the switch controller 212. That is, the current sensor 214 capable of sensing the magnitude of the current flowing through the LED part 230 and transmitting to the switch controller 212 may be included anywhere within the circuit diagram without limitation.

Next, an LED lighting device using the ballast for a fluorescent lamp in accordance with a third embodiment will be described.

Third Embodiment

Figure 6:
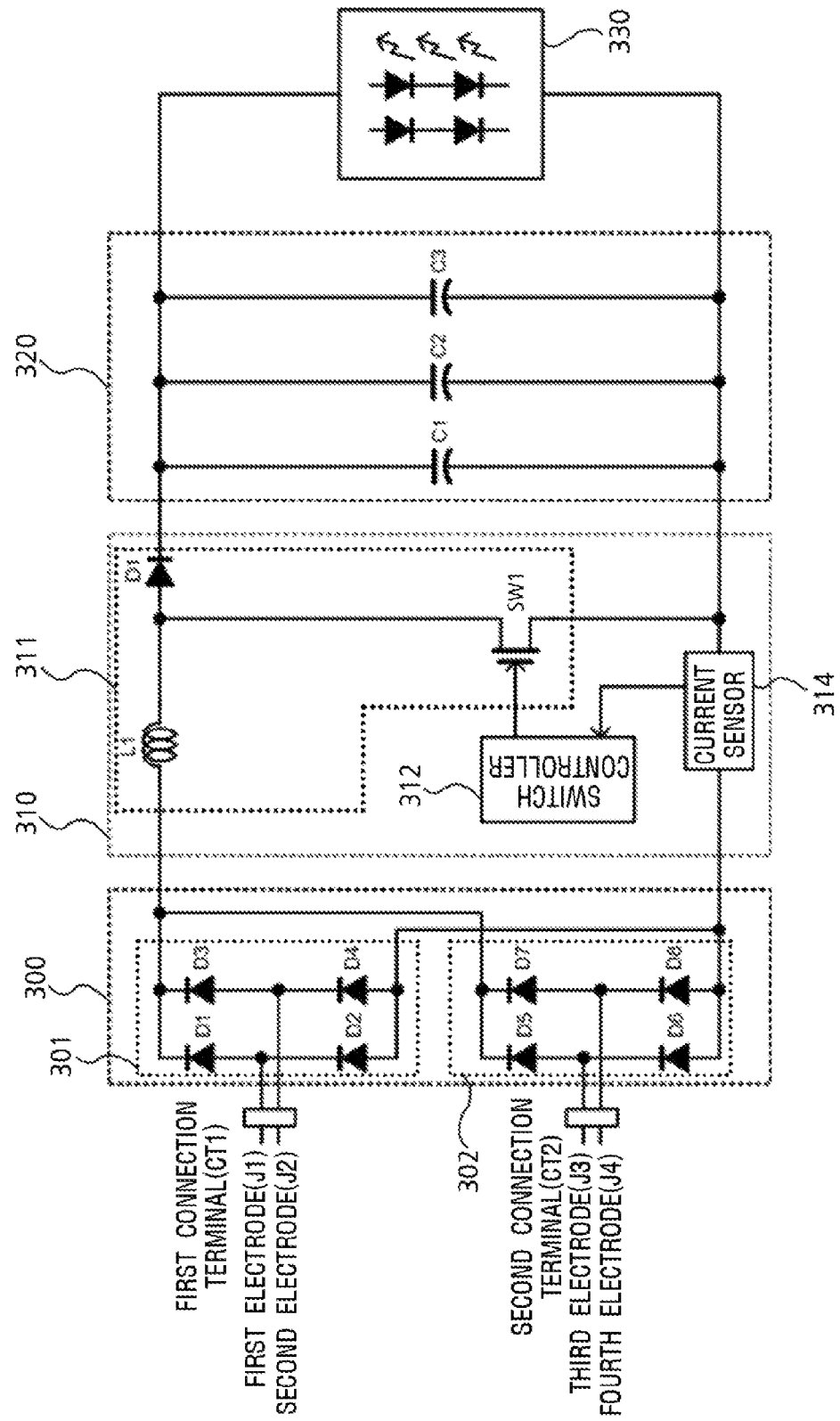
FIG. 6 is a circuit diagram of an LED lighting device using the ballast for a fluorescent lamp in accordance with further another embodiment of the present invention.

FIG. 6 is a circuit diagram of an LED lighting device using the ballast for a fluorescent lamp in accordance with a third embodiment of the present invention.

Referring to FIG. 6, the LED lighting device using the ballast for a fluorescent lamp in accordance with the third embodiment includes a rectifier 300 which rectifies power voltage outputted from the ballast for a fluorescent lamp, a controller 310 which receives the output voltage of the rectifier and outputs rated voltage and current for a later-mentioned LED part 330, and the LED part 330 which includes one or more LED devices which are connected in parallel with or in series to each other. The LED lighting device may further include a filter 320 which smoothes an output current of the controller 310 and transmits to the LED part 330.

Since the rectifier 300, the filter 320 and the LED part 330 of the LED lighting device which is shown in FIG. 6 and uses the ballast for a fluorescent lamp in accordance with the third embodiment are the same as those of the first embodiment, a detailed description thereof will be omitted.

As shown in FIG. 6, the controller 310 includes a switching converter 311 and a switch controller 312. The switching converter 311 simulates the output voltage (Vballast) of the rectifier 300 and generates a converter input current (Iconverter) inputted to the switching converter 313 of the controller 310. The switch controller 312 controls the on/off of a switch (SW) included in the switching converter 311. Also, the controller 310 may further include a current sensor 314 which senses current flowing through the LED part 330 and then transmits to the switch controller 312.

The switching converter 311 includes a switch SW1, an inductor L1 and a diode D9. The switch SW1 may be implemented by an MOS transistor for the purpose of a rapid response. The diode D9 may be a freewheeling diode.

Here after, the operation of the controller 310 will be described in detail.

The switching converter 311 generates the converter input current (Iconverter) which simulates a waveform of the output voltage (Vballast) of the rectifier 300. The switching converter 311 may be a boost converter, a SEPIC converter or a Cuk converter. For convenience of description, the embodiment describes an example of a case where the switching converter 311 is the boost converter.

As shown in FIG. 6, the switch SW1 of the boost converter 311 is turned on, current is increased in the inductor L1 and energy is accumulated. When the boost converter 311 is turned off, the energy is transferred to the filter 3210 or the LED part 330 through the freewheeling diode D9. Since the operation of the boost converter 311 is performed by a well-known circuit, a detailed description thereof will be omitted. The switch controller 312 senses a magnitude of the current flowing through the LED part 330, and then on/off controls the switch SW1 of the boost converter 311. Meanwhile, the switch controller 312 may further include the separate current sensor 314 which senses the magnitude of the current flowing through the LED part 330 and then transmits to the switch controller 312.

The boost converter 311 controls the switch controller 312, thereby generating a current signal having the same cycle as that of the rectified ballast output voltage (Vballast) which is inputted to the controller 310.

FIG. 7 shows waveforms of the rectified output voltage (Vballast) of the ballast and the converter input current (Iconverter).

As shown in FIG. 7, a converter input voltage applied from the ballast to the LED lighting device is the same as the rectified ballast output voltage (Vballast). Since the converter input voltage (Vballast) and the current (Iconverter) have the same phase, the ballast regards an equivalent impedance of the LED lighting device as a pure resistance.

Specifically, since the ballast output voltage (Vballast) is proportional to an equivalent input resistance (R_in) of the lighting device, the ballast output voltage (Vballast) and the equivalent input resistance (R_in) of the lighting device have a relation of equation (1).

$$\text{ballast output power}\left(\frac{Vballast^2}{Rin}\right) = \qquad \text{equation (1)}$$
$$\text{LED power consumption} \propto R\_in$$

Referring to equation (1), since the ballast output voltage (Vballast) is proportional to the equivalent input resistance (R_in) of the lighting device, the ballast output voltage is proportional to an input resistance (R_in) of the lighting device.

Meanwhile, as described above, the same operation as above can be performed by using the SEPIC converter or the Cuk converter as well as the boost converter as the switching converter 311.

In summary, the LED lighting device using the ballast for a fluorescent lamp in accordance with the third embodiment of the present invention uses the boost converter 311, and thus controls the magnitude of the converter input current (Iconverter) which is inputted to the boost converter 311 of the controller 310 of the LED lighting device. The boost converter 311 controls the input current (Iconverter) inputted to the controller 310 in correspondence with the inputted ballast output voltage (Vballast), so that a required power is supplied to the LED part 330 from the ballast. Further, the LED lighting device using the ballast for a fluorescent lamp in accordance with the third embodiment equalizes the phases of the input voltage and the input current which are applied to the LED part, so that a power factor is improved.

As described above, the LED lighting device using the ballast for a fluorescent lamp can be easily implemented according to the embodiment of the present invention. That is, the power transmitted from the ballast is controlled such that only the power required by the LED part is transmitted, so that rated voltage and current can be supplied to the LED part and a load applied to other passive devices or chips can be reduced. Accordingly, the LED lighting device is compatible with any conventional ballast in accordance with the power control of the controller and it is possible to stably supply electric power and to protect circuit elements.

Additionally, unlike the conventional fluorescent lighting devices, there is no need to use all four electrodes of the ballast. While the conventional ballast for a fluorescent lamp has been configured in various types, for example, configured to have two or four electrodes, the LED lighting device using the ballast for a fluorescent lamp in accordance with the embodiment of the present invention is able to light the LED device by using at least two electrodes. As a result, the LED lighting device using the ballast for a fluorescent lamp in accordance with the embodiment of the present invention is compatible with various types of ballasts having two or four electrodes.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A light emitting diode (LED) lighting device using a ballast for a fluorescent lamp, the LED lighting device comprising:
    an LED part including at least one LED device;
    a rectifier configured to rectify a power signal outputted from the ballast for a fluorescent lamp;
    a controller configured to receive an output signal of the rectifier and control power transmitted from the ballast to the LED part;
    a switch connected between the rectifier and the LED part and configured to electrically connect or disconnect current flow between the rectifier and the LED part; and
    a switch controller configured to control on/off operation of the switch based on an output voltage of the rectifier and adjust an electrical connection time of the switch according to device values of a resonance circuit of the ballast.

2. The LED lighting device of claim 1, wherein the switch controller is configured to control on/off of operation of the switch by using a current flowing through the LED part.

3. The LED lighting device of claim 2, further comprising a current sensor configured to sense a magnitude of the current flowing through the LED part and transmit the sensed current magnitude to the switch controller.

4. The LED lighting device of claim 3, wherein the current sensor is connected between one terminal of the switch and one terminal of the LED part.

5. The LED lighting device of claim 1, further comprising a filter configured to smooth an output signal from the controller and transmit the smoothed output signal to the LED part.

6. The LED lighting device of claim 1, wherein the controller comprises a second switch configured to prevent a current from backflowing from the LED part.

7. A light emitting diode (LED) lighting device using a ballast for a fluorescent lamp, the LED lighting device comprising:
    an LED part including at least one LED device;
    a rectifier configured to rectify a power signal outputted from the ballast for a fluorescent lamp;

a controller configured to receive an output signal of the rectifier and control power transmitted from the ballast to the LED part, wherein the controller comprises:
- a switching converter including a switch and configured to generate a converter input current that has the same phase as a phase of an output voltage of the rectifier; and
- a switch controller configured to input the generated converter input current, control on/off of the switch included in the switching converter, and adjust an electrical connection time of the switch according to device values of a resonance circuit of the ballast.

8. The LED lighting device of claim 7, wherein the switching converter is one selected from the group consisting of a boost converter, a SEPIC converter or a Cuk converter.

9. The LED lighting device of claim 7, wherein the switch controller is configured to control the on/off of operation of the switch based on at least one of the output voltage of the rectifier, an output current of the rectifier and a current flowing through the LED part.

10. The LED lighting device of claim 7, further comprising a filter configured to smooth an output signal from the controller and transmit the smoothed output signal to the LED part.

11. The LED lighting device of claim 7, wherein the controller comprises a second switch configured to prevent a current from backflowing from the LED part.

* * * * *